455-5 AU 233 EX
5TP8102 XR 3,835,393
455/5

United States Patent [19]

Marron

[11] 3,835,393

[45] Sept. 10, 1974

[54] DUPLEX CABLE COMMUNICATIONS NETWORK EMPLOYING AUTOMATIC GAIN CONTROL UTILIZING A BAND LIMITED NOISE AGC PILOT

[75] Inventor: Henry B. Marron, Moorestown, N.J.

[73] Assignee: Jerrold Electronics Corporation, Philadelphia, Pa.

[22] Filed: Apr. 17, 1972

[21] Appl. No.: 244,470

[52] U.S. Cl. .............. 325/308, 178/DIG. 13, 325/3, 179/170 A

[51] Int. Cl. .......................... H04b 3/56, H04b 1/60

[58] Field of Search .................. 325/1, 3, 308, 309; 179/170 R, 170 A, 170 B, 170.8, 170.4, 170.6, 175.31 R; 178/71, 73, DIG. 13, 15 BP; 333/16, 17; 328/104

[56] References Cited

UNITED STATES PATENTS

| | | | |
|---|---|---|---|
| 2,758,281 | 8/1956 | Carleson | 179/170 R |
| 2,768,353 | 10/1956 | Mansson | 179/170 A |
| 2,870,271 | 1/1959 | Cronburg | 179/170 R |
| 2,876,833 | 3/1959 | Lundry | 179/15 BC |
| 3,302,175 | 1/1967 | Deracinos | 333/16 |
| 3,414,688 | 12/1968 | Hermes | 179/170 A |
| 3,668,307 | 6/1972 | Face et al. | 178/5.6 |
| 3,737,584 | 6/1973 | Kaneko et al. | 179/15 BP |
| 3,750,022 | 7/1973 | Curry et al. | 178/DIG. 13 |
| 3,755,737 | 8/1973 | Eller | 325/308 |

*Primary Examiner*—Robert L. Griffin
*Assistant Examiner*—Aristotelis M. Psitos
*Attorney, Agent, or Firm*—John M. Calimafde; Stephen B. Judlowe

[57] ABSTRACT

A full duplex private communications network provides independent automatic gain control circuitry for the oppositely-propagating signals. Band limited white noise is used to effect automatic gain control for information converging in the distribution network towards common head end equipment. Automatic gain control for this reverse direction propagation is thereby made insensitive to frequency and phase perturbations of any AGC pilot, and also performs well notwithstanding malfunctions in system communications links.

5 Claims, 2 Drawing Figures

DUPLEX CABLE COMMUNICATIONS NETWORK EMPLOYING AUTOMATIC GAIN CONTROL UTILIZING A BAND LIMITED NOISE AGC PILOT

DISCLOSURE OF INVENTION

This invention relates to communications systems and, more specifically, to a bilateral (full duplex) communications system including improved automatic gain control circuitry.

Figure 1:
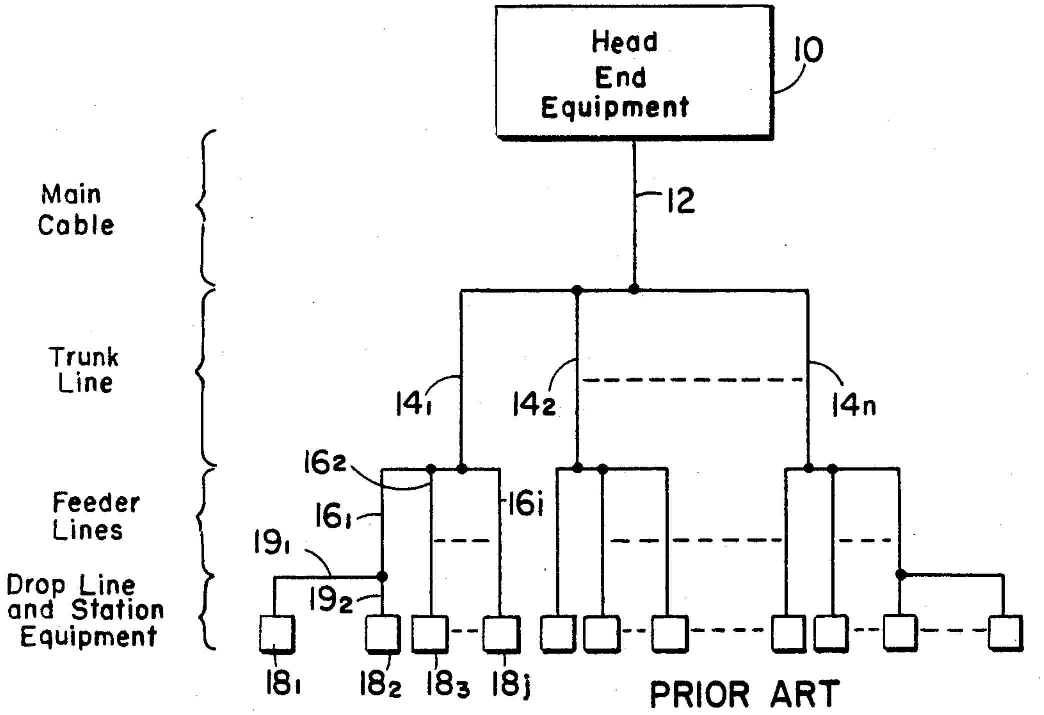

Private line communications systems, e.g., community antenae television (CATV) networks, are finding increasing utility. The distribution network topography for an illustrative CATV system is shown in FIG. 1, and includes "head end" equipment typically comprising complex antenae arrays for recovering often weak video signals, and amplification circuitry. Depending upon particular requirements, the head end apparatus may include additional signal processing circuitry, such as that to generate supplementary cable programming (e.g., special events, theater, sports, time-weather, or the like, possibly on an extra revenue basis).

The ensemble of television programs recovered and originated at the head end equipment 10 is impressed on a main cable 12 which branches into a plurality of trunk lines (cables) 14. The trunk lines 14, in turn, energize plural feeder lines 16 which are usually associated with a limited area, e.g., a street. Finally, plural drop lines 19 connect individual subscriber station equipment 18 (a standard television receiver) to the feeder cables. While shown in ordered fashion in FIG. 1, it is understood that the lines 12, 14 and 16 follow irregular physical paths to provide private cable communcations services to all portions of the area served by the CATV system proprietor. Also, it will be appreciated by those skilled in the art that the cables 12, 14 and 16 include physically spaced repeater amplifiers to maintain electronic signal strength along the composite distribution network.

A CATV cable system as a general matter includes bandwidth capacity beyond that required to distribute locally obtainable commercial television programming. Such extra capacity exists above and below the television frequency band; between channels 6 and 7; and in the spectra of locally unused channels. It is desired in some applications that some part (or all) of this extra communications capability be applied to provide communications from the subscriber equipment 18 toward the head end 10. Thus, for example, this "reverse" direction communications may be used for CATV system billing when special extra fee programs are made available to viewers; and for other services not necessarily related to video reception such as banking, product ordering and the like.

It is desirable that an automatic gain control mechanism be provided for this reverse transmission such that the information-bearing electrical signals are maintained at a proper (and bounded) level throughout the cable network. However, this is difficult to effect in practice since a number of diversely generated signals are progressively converged toward the system head end (this is the direct converse of the monotonically diverging video signal distribution). In overall view, automatic gain control (AGC) for reverse transmission gives rise to beats of separately produced AGC radio frequency pilot signals; AGC pilot phasing problems; and excess repeater amplifier gain where one (selected) pilot carrier is lost, as when a trunk or feeder cable is disrupted. More specifically, where each feeder (or trunk) cable develops its onw AGC pilot, these signals may differ slightly in frequency causing beats when the signals from two cables merge in a cable of increasing significance, i.e., towards the head end. Even when the frequencies are made identical (as by dividing down the AGC pilot for forward direction transmission), phase problems arise when a cable changes in effective length due to temperature variations. Further when the AGC pilot carrier on one of plural merging branches is preselected, the following repeater amplifiers go to full gain, typically becoming overloaded, when that branch goes down, possibly interfering with all system reverse transmission.

It is thus an object of the present invention to provide an improved bilateral communications system.

More specifically, it is an object to provide a communications system with automatic gain control where transmissions originating at plural diverse locations converge toward a common distinction.

The above and other objects of the present invention are realized in a specific, illustrative CATV signal distribution system employing common head end equipment, and a signal diverging network for coupling video signals from the head end apparatus to subscriber station receivers. To effect reverse transmission with automatic gain control, band limited white noise is impressed upon each of plural converging cables, e.g., feeder lines.

Each repeater amplifier for regenerating signals propagating towards the system head end includes a narrow band pass filter for extracting a like frequency quantum of the white noise, and for effecting AGC depending upon the amplitude thereof. At the last amplifier before cable convergence, the white noise band is attenuated, such that the noise amplitude is fully reconstituted to its proper level when the signals converge at the cable of next significance. Thus, if one of two converging cables is interupted (worst case), the amplifiers in the cable of next significance merely increase in gain by 3db (a factor of two) which can be readily accommodated.

Figure 2:
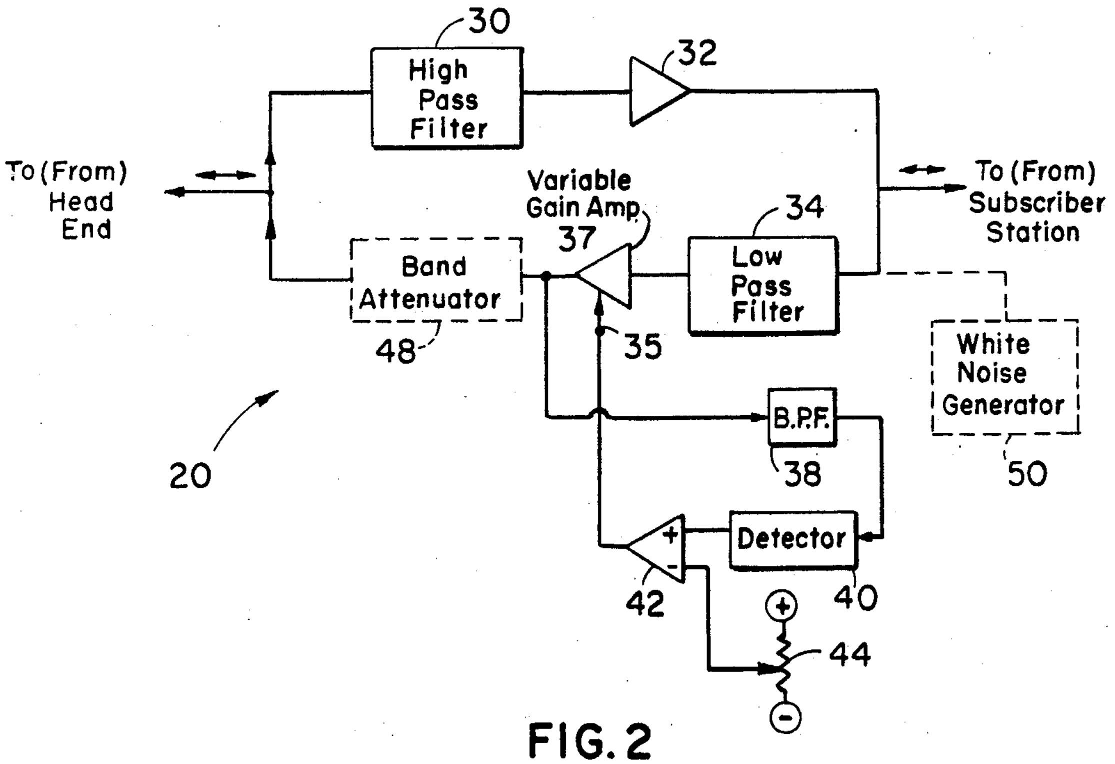

The above and other features and advantages of the present invention will become readily apparent from the following description of an illustrative embodiment thereof, described in detail hereinbelow in conjunction with the accompanying drawing in which:

FIG. 1 schematically depicts an illustrative CATV distribution system as above-discussed; and FIG. 2 illustrates a repeater amplifier for a communications system embodying the principles of the present invention.

Referring again to FIG. 1, there is schematically shown the network topography of a communications system, e.g., a CATV network. The network provides bilateral (full duplex) communications, i.e., distributes television programs regenerated or originated at head end equipment 10 for end delivery to television receivers at subscriber locations 18. The system also provides for reverse signal propagation, i.e., from the subscriber stations 18 to the head end.

The network comprises an ordered hierarchy of distribution cables, varying in significance (signal and distribution density) from the main cable 12 handling all signals in the network, to feeder lines 16 which service only an associated group of subscriber drop lines 19.

Cables of intermediate significance comprise trunk lines 14. As a general matter, additional cable strata may be included in the network topography, and some cable orders may be deleted in whole or in part, i.e., in an extreme case, some subscriber lines 19 may be directly driven by the main cable 12.

The various system cables may be of extensive length which may vary considerably. Accordingly, regularly spaced repeater amplifier circuits are included in each such cable. The gain of each amplifier (in each direction) is typically made equal in amplitude to the signal attenuation in the preceding length of cable, i.e., the cable length to the next preceding amplifier. Thus, signal strength is maintained nearly constant within narrow bounds over the entire system.

To effect this constant signal level, the repeater amplifiers advantageously include automatic gain control (AGC) circuitry which operates on one property of the propagating signal - typically an unmodulated radio frequency pilot, to maintain the signal output of the amplifier at a prescribed level, all as well known to those skilled in the art.

The oppositely propagating signals conveyed over the FIG. 1 system occupy different frequency bands which are separable by electronic filters. It will be assumed for concreteness that the reverse transmissions occupy a frequency band below that of the video television signals. As a general matter any other form of signal multiplexing can be employed.

Referring now to FIG. 2, there is shown composite repeater amplifier circuitry 20 in accordance with the principles of the present invention. Cascaded repeaters 20 are serially included in any system cable 12, 14 or 16, each unit 20 including one port disposed toward the head end (left side in FIG. 2) and another port desposed toward the subscriber stations.

The system video programming reaching the repeater amplifier from the left in FIG. 2 passes through the high pass filter 30; is amplified by an amplifier 32; and passes out of the right repeater port in FIG. 2 for end delivery to the appropriate system subscribers. The amplifier 32 is AGC controlled, as by the use of an AGC radio frequency pilot in the well known manner. There is no difficulty in this regard since only one AGC carrier need be generated at the head end equipment 10, and the AGC circuitry in each branched trunk and feeder line can operate on the replica of this carrier without any interaction between trunk or feeder lines.

Signals from the subscriber stations reach the FIG. 2 amplifier from the right in the drawing, and pass through a low pass filter 34 which blocks the video output of the amplifier 32. For AGC purposes with respect to the reverse, subscriber-generated transmissions, band limited noise, e.g., white noise, is introduced into all lines to the network topography for which AGC is desired, e.g., the remote (from the head end) ends of all the feeder lines 16 of FIG. 1. To this end, the first repeater amplifier in each feeder line 19 includes a noise generator 50 for developing the white noise - e.g., of 3 mhz extent at a predetermined amplitude. The generator 50 may comprise any well known noise generator, e.g., an open heterodyne circuit, followed by a band defining filter and an amplitude limiter. The noise band is made of a frequency which passes through the low pass filter 34.

For each system repeater amplifier 20 then, the low frequency band signals comprising subscriber originated information and the 3 mhz noise band pass through a variable gain amplifier 37 for amplification. The gain of the amplifier 37 is automatically adjusted by a control signal at an amplifier control port 35 in the well known manner to effect AGC by maintaining the noise signal at a constant magnitude. This effects the desired result of fixing the information signal at the output of the amplifier 37 to the desired level, since the noise band is originally generated with a predetermined amplitude relationship with respect to the intelligence signals.

The automatic gain control function may illustratively be effected by selecting a part (or all) of the noise band - as by a band pass filter 38 one mhz wide with a center frequency at or near the center of the 3 mhz noise band. The magnitude of the passed noise signal (e.g., of 1 mhz extent) is then determined in a detector 40 on either a power or voltage basis. The detector 40 may thus illustratively comprise a square law detector, an integrator or average value circuit, responsive to one noise signal polarity, or any other noise detector well known to those skilled in the art. The output of the detector 40 is then compared with a reference signal (such as the output voltage generated at the tap of a potentiometer 44) in a high gain difference amplifier 42. The output of the difference amplifier 42 thus serves to obviate any difference between the detected noise amplitude and the prescribed reference level therefor by AGC feedback station.

For most system amplifiers, the amplified low frequency band information and AGC noise signals then pass out of the left amplifier port for eventual reception at the head end equipment 10.

The high pass filter 30 exhibits propagation of the amplified low band information from left to right in the FIG. 2 amplifier.

At the convergence of system lines, i.e., where *i* feeder lines $16_1$–$16_i$ converge into the truck line $14_1$, the last repeater amplifier 20 in each feeder line $16_1$–$16_i$, i.e, the repeaters nearest the cable $14_1$, includes a band attenuator 48 for attenuating the 3 mhz noise band by a factor $1/i$. Accordingly, after convergence on the cable $14_1$, the 3 mhz AGC noise band (directly additive upon convergence) will be reconstituted to its original and proper level.

Thus, throughout the entire distribution network, automatic gain control is effected for signals propagating in each direction, the noise band being employed for this purpose for reverse direction propagation.

Several features attendant to the reverse direction (converging cable) AGC circuitry will now be observed. First, the bounds of the noise band in any line, or the match between these bounds between lines is not critical. The filter 38 merely selects some central part of the noise band which is common to all lines, and is thus unaffected by any mismatch at the band extremities. There is thus not the requirement for frequency identity as is the case for separate radio frequency AGC carriers.

Then also, separate white noise signals in a linear network are additive without regard to phase or cable length. Correspondingly, such phasing is critical for a r.f. AGC pilot.

Further, loss of any line or lines through malfunction or physical impediment does not severely impair the remainder of the system. Thus, for example, assume that the feeder line $16_2$ is severed, thus causing loss of its contribution to the 3 mhz AGC noise band. The noise band reaching the trunk cable $14_1$ would therefor decrease by a factor $(i-1)/i$ causing a signal increase in the following cable $14_1$ of $i/(i-1)$. For worst case conditions ($i=2$), signal strength on the line $14_1$ increases by only 3db. This is small compared to the typical signal capacity of the system amplifiers 37, and thus loss of the line $16_2$ does not impair or destroy any further system communications.

Compare with the foregoing the situation where the AGC pilot on one of several converging band lines is selected for AGC use. A malfunction in the line selected to supply the AGC carrier results in the following amplifiers going to full gain, resulting in system distortion and overloads.

Thus, the system described herein has thus been shown by the above to accomplish automatic gain control in an improved, desirable manner.

The above-described arrangement is merely illustrative of the principles of the present invention. Numerous modifications and adaptations thereof will be readily apparent to those skilled in the art without departing from the spirit and scope of the present invention. Thus, for example, the network cables shown in FIG. 1 may comprise any communications channel or link.

What is claimed is:

1. In combination in a cable television bidirectional signal propagating system wherein plural first system signal propagating channels converge into a second system signal propagating channel at a convergence point for conveying signals in a cable network in a reverse direction toward a cable system head end, at least one variable gain repeater amplifier included in each of said first and second system signal propagating channels, means for supplying a prescribed frequency band of noncoherent noise signals to the input of said repeater amplifier in each of said first signal propagating channels, and automatic gain control circuit means included in each of said repeater amplifiers for adjusting the gain of the associated repeater amplifier responsive to the amplitude of the noise signal at said amplifier.

2. A combination as in claim 1 wherein said noncoherent noise signal supplying means includes means for supplying white noise.

3. A combination as in claim 1 wherein said automatic gain control circuit means includes feedback means comprising band pass filter means for passing a part of the noise band supplied by said noncoherent noise signal supplying means, a noise detector, and additional amplifier means.

4. A combination as in claim 1 further comprising head end video signal supplying means connected to said second system signal propagating channel, wherein said signal propagating channels further comprise means for amplifying said video signals.

5. A combination as in claim 1 further comprising band attenuating means associated with and coupled to one amplifier in each of said first signal propagating channels, said attenuating means attenuating signals of the same frequency range as that of the noise signal supplying means.

* * * * *